US008346697B2

(12) United States Patent
Lambov

(10) Patent No.: US 8,346,697 B2
(45) Date of Patent: Jan. 1, 2013

(54) DIRECT CONSTRUCTION OF FINITE STATE MACHINES

(75) Inventor: Branimir Lambov, Tyrrelstown (IE)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 12/262,853

(22) Filed: Oct. 31, 2008

(65) Prior Publication Data

US 2010/0114811 A1    May 6, 2010

(51) Int. Cl.
*G06F 17/00* (2006.01)
*G06F 7/38* (2006.01)
*G06F 17/27* (2006.01)
*G06N 5/00* (2006.01)

(52) U.S. Cl. ................... 706/45; 326/46; 704/9
(58) Field of Classification Search ............ None
See application file for complete search history.

(56) References Cited

U.S. PATENT DOCUMENTS

| | | | |
|---|---|---|---|
| 7,119,577 B2 * | 10/2006 | Sharangpani | 326/46 |
| 7,240,040 B2 * | 7/2007 | Wyschogrod et al. | 706/48 |
| 7,441,212 B1 * | 10/2008 | van Antwerpen et al. | 716/132 |
| 7,512,634 B2 * | 3/2009 | McMillen | 1/1 |
| 7,689,530 B1 * | 3/2010 | Williams et al. | 706/62 |
| 7,788,206 B2 * | 8/2010 | McMillen et al. | 706/48 |
| 7,899,904 B2 * | 3/2011 | Ruehle | 709/224 |
| 7,962,434 B2 * | 6/2011 | Estan et al. | 706/47 |
| 2008/0186971 A1 * | 8/2008 | Carmichael et al. | 370/392 |
| 2008/0270342 A1 * | 10/2008 | Ruehle | 707/1 |

OTHER PUBLICATIONS

Goldberg, R. R. "Finite State Automata from Regular Expression Trees." The Computer Journal 36.7 (1993): 623-630.*

Lee, D.; Yannakakis, M.; , "Principles and methods of testing finite state machines—a survey," Proceedings of the IEEE, vol. 84, No. 8, pp. 1090-1123, Aug. 1996 doi: 10.1109/5.533956.*

Bruce W. Watson, A new algorithm for the construction of minimal acyclic DFAs, Science of Computer Programming, vol. 48, Issues 2-3, Aug.-Sep. 2003, pp. 81-97, ISSN 0167-6423, 10.1016/S0167-6423(03)00012-1.*

Bruce W. Watson, A New Recursive Incremental Algorithm for Building Minimal Acyclic Deterministic Finite Automata, Department of Computer Science University of Pretoria, 2003.*

(Continued)

*Primary Examiner* — Kakali Chaki
*Assistant Examiner* — Daniel Pellett
(74) *Attorney, Agent, or Firm* — Holland & Knight LLP; Brian J. Colandreo, Esq.; Michael T. Abramson, Esq.

(57) ABSTRACT

A method and system for direct construction of a minimal deterministic finite state machine corresponding to a regular expression are provided. The method includes providing a regular expression represented as a regular expression tree with nodes of operators and leaves of elementary character transitions and traversing the regular expression tree recursively to build minimal finite state automata (FSAs) corresponding to the branches of the tree, wherein the FSAs end in a specified tail automaton. The operators are concatenation, alternation, and Kleene closure. A concatenation operation is performed by recursive construction in reverse order wherein each automaton built becomes the tail for the preceding argument of the operation. An alternation operation is performed by recursively building automata corresponding to the arguments of the operation with the same tail and merging them. A Kleene closure operation is performed by: building an automaton terminating in a unique marker; merging the automaton with the tail automaton to form a combined automaton; and traversing the combined automaton to expand the marker into transitions and states to achieve the intended behaviour.

22 Claims, 18 Drawing Sheets

OTHER PUBLICATIONS

Watson, Bruce. "A Fast New Semi-incremental Algorithm for the Construction of Minimal Acyclic DFAs." Automata Implementation Lecture Notes in Computer Science p. 121-132 (1999).*

Mihov S. Direct construction of minimal acyclic finite states automata. Annuaire de l'Université de Sofia 1998; 92(2).*

* cited by examiner

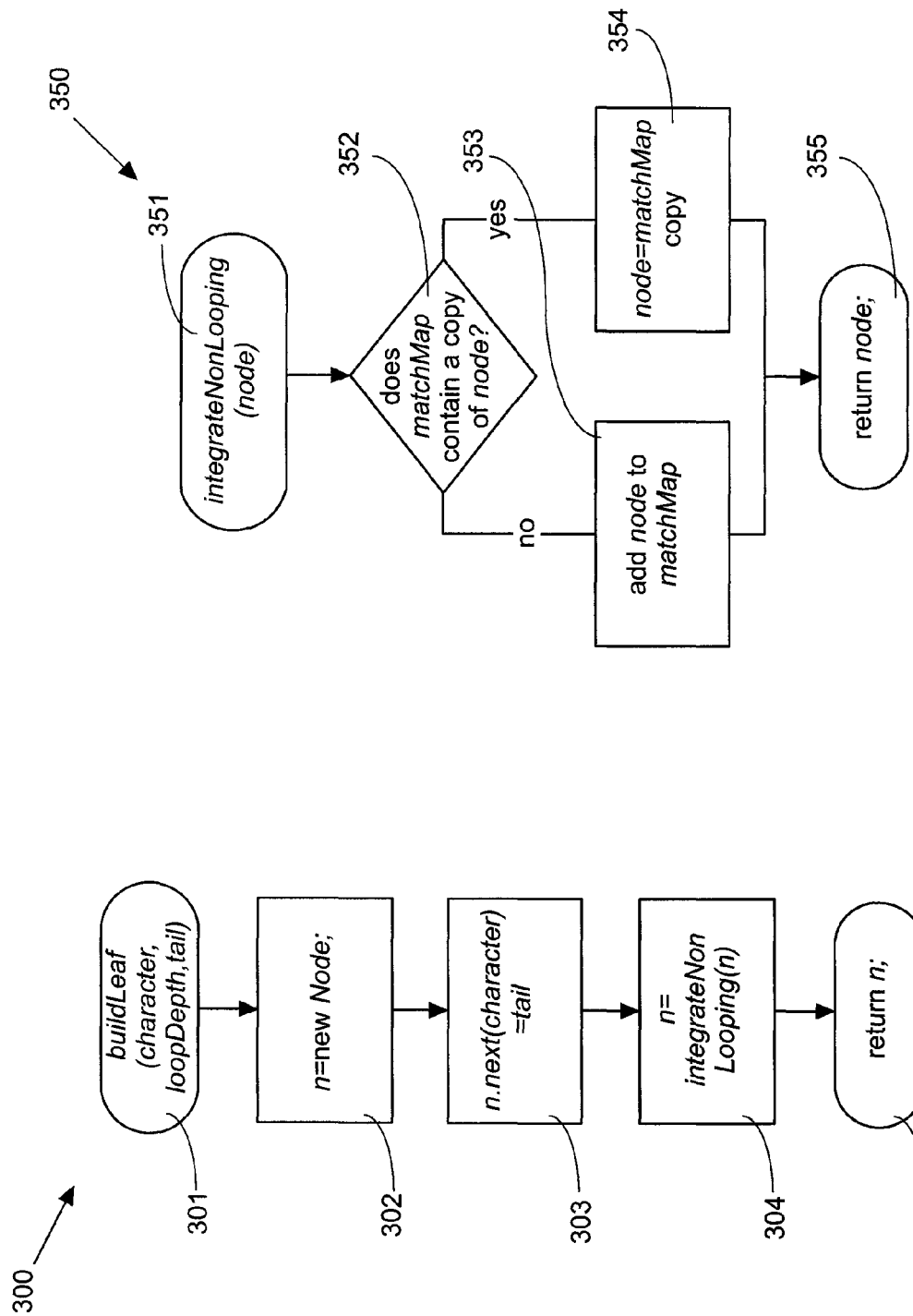

DIRECT CONSTRUCTION OF FINITE STATE MACHINES

FIELD OF THE INVENTION

This invention relates to the construction of finite state machines. In particular, it relates to direct construction of minimal deterministic finite state machines from regular expressions.

BACKGROUND OF THE INVENTION

The construction of minimal deterministic finite state automata (FSA) corresponding to regular expressions is an operation of very significant importance in a wide range of applications of computer science, including network firewalls, virus protection, natural language processing and biological computing amongst others.

The classical process of translation of regular expressions is a multi-step process, consisting of:
1. construction of a non-deterministic FSA corresponding to the regular expression;
2. determinisation of the automaton;
3. minimization of the obtained deterministic FSA.

The process is complex. Its space requirements are usually rather large due to the size of the constructed non-minimal deterministic FSA at Step 2. It also requires that the automaton be completely rebuilt to accommodate every modification of the source regular expression.

SUMMARY OF THE INVENTION

According to a first aspect of the present invention there is provided a method of direct construction of a minimal deterministic finite state machine corresponding to a regular expression, comprising: providing a regular expression represented as a regular expression tree with nodes of operators and leaves of elementary character transitions; traversing the regular expression tree recursively to build minimal finite state automata (FSAs) corresponding to the branches of the tree, wherein the FSAs end in a specified tail automaton.

A concatenation operation may be performed by recursive construction in reverse order wherein each automaton built becomes the tail for the preceding argument of the operation. An alternation operation may be performed by recursively building automata corresponding to the arguments of the operation with the same tail and merging them. A Kleene closure operation may be performed by: building an automaton terminating in a unique marker; merging the automaton with the tail automaton to form a combined automaton; and traversing the combined automaton to expand the marker into transitions and states to achieve the intended behaviour. The method may include building an automaton reflecting a character transition by creating a new node with a single transition pointing to the initial node of the tail automaton.

The method may include merging during the FSAs build by merging of minimal automata which only process combinations of different non-empty nodes as part of the alternation operation and as part of the Kleene closure operation.

The method may include integration of each newly constructed node comprising: verifying if a newly constructed node belongs to a strongly connected component or not; a newly constructed node that does not belong to a strongly connected component is replaced by an existing equivalent class of node, if such an equivalent already exists; newly constructed nodes that do belong to a strongly connected component are collected together identifying the strongly connected component and are replaced by an existing combination of equivalent nodes for the component, if such an equivalent for the component already exists.

The method may include maintaining a map of equivalent classes of nodes to which a newly constructed node is compared; and adding a non-matching newly constructed node to the map.

The method may also include maintaining a map of equivalent classes of strongly connected components; and adding a non-matching collection of newly constructed nodes for a strongly connected component.

According to a second aspect of the present invention there is provided a method of direct construction of a minimal finite state machine corresponding to a regular expression, comprising: providing a regular expression represented as a regular expression tree with nodes of operators and leaves of elementary character transitions; traversing the regular expression tree recursively to build minimal finite state automata (FSAs) corresponding to the branches of the tree, where each newly constructed node is processed by an integration procedure including: verifying if a newly constructed node belongs to a strongly connected component or not; a newly constructed node that does not belong to a strongly connected component is replaced by an existing equivalent class of node, if such an equivalent already exists; newly constructed nodes that do belong to a strongly connected component are collected together identifying the strongly connected component and are replaced by an existing combination of equivalent nodes for the component, if such an equivalent for the component already exists.

According to a third aspect of the present invention there is provided a method of direct construction of a minimal finite state machine corresponding to a regular expression, comprising: providing a regular expression represented as a regular expression tree with nodes of operators and leaves of elementary character transitions; traversing the regular expression tree recursively to build minimal finite state automata (FSAs) corresponding to the branches of the tree, including: using a unique marker to terminate an argument of a Kleene closure; and expanding the unique marker into transitions and states to achieve an intended behaviour.

According to a fourth aspect of the present invention there is provided a computer software product for construction of a minimal deterministic finite state automaton (FSA) corresponding to a regular expression, the product comprising a computer-readable storage medium, storing a computer in which program comprising computer-executable instructions are stored, which instructions, when read executed by a computer, perform the following steps: providing a regular expression represented as a regular expression tree with nodes of operators and leaves of elementary character transitions; traversing the regular expression tree recursively to build minimal finite state automata (FSAs) corresponding to the branches of the tree, wherein the FSAs end in a specified tail automaton.

According to a fifth aspect of the present invention there is provided a system of direct construction of a minimal deterministic finite state machine corresponding to a regular expression, comprising: a processor; means for providing a regular expression represented as a regular expression tree with nodes of operators and leaves of elementary character transitions; means for traversing the regular expression tree recursively to build minimal finite state automata (FSAs) corresponding to the branches of the tree, wherein the FSAs end in a specified tail automaton.

In this disclosure, an alternative method of direct construction of the minimal deterministic FSA from the regular expression is proposed represented in an expression tree. The method is incremental and the minimization of the automaton is carried out while the automaton is being built. This should result in considerable space savings and reduced complexity in important practical scenarios, such as where a large automaton is being built as a combination of multiple simple rules.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 3A is a flow diagram processing character transitions in accordance with an aspect of the present invention;

FIG. 3B is a flow diagram of an integration function used in the flow diagram of FIG. 3A;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system of direct construction of a minimal deterministic finite state machine are described corresponding to a regular expression. The regular expression is represented as a regular expression tree with nodes of operators and leaves of elementary character transitions. The regular expression tree is traversed recursively to build minimal finite state automata (FSAs) corresponding to the branches of the tree where the FSAs end in a specified tail automaton.

For each branch of the tree, the method constructs a corresponding automaton, which also means that it constructs an automaton corresponding to the whole tree (because the tree is the branch that starts at the root). During the course of the build the partial results of the algorithm form a conglomeration of independent automata that share some of their states. It becomes a single minimal automaton when the whole input tree is processed.

In this description, regular expression trees are referred to with nodes as operators. This form of node should not be confused with the nodes being created in the FSA which represent the states of the FSA.

The Regular Expression Tree

All regular expressions (referred to as "regex") can be written using three basic operations: concatenation (., usually omitted), alternation (|) and Kleene closure (*). Other commonly used operations can be expressed using these three (e.g. "x+" as "x·x*"). Note that some of the "regex" operators used in some programming languages (e.g. subsequence matching) go outside the scope of the regular expression paradigm and as such are not directly supported by this method.

For the purpose of this disclosure it is assumed that the regular expression has been parsed into an expression tree where the nodes are operators (concatenation, alternation or Kleene closure) and the leaves are elementary character transitions.

Figure 1:
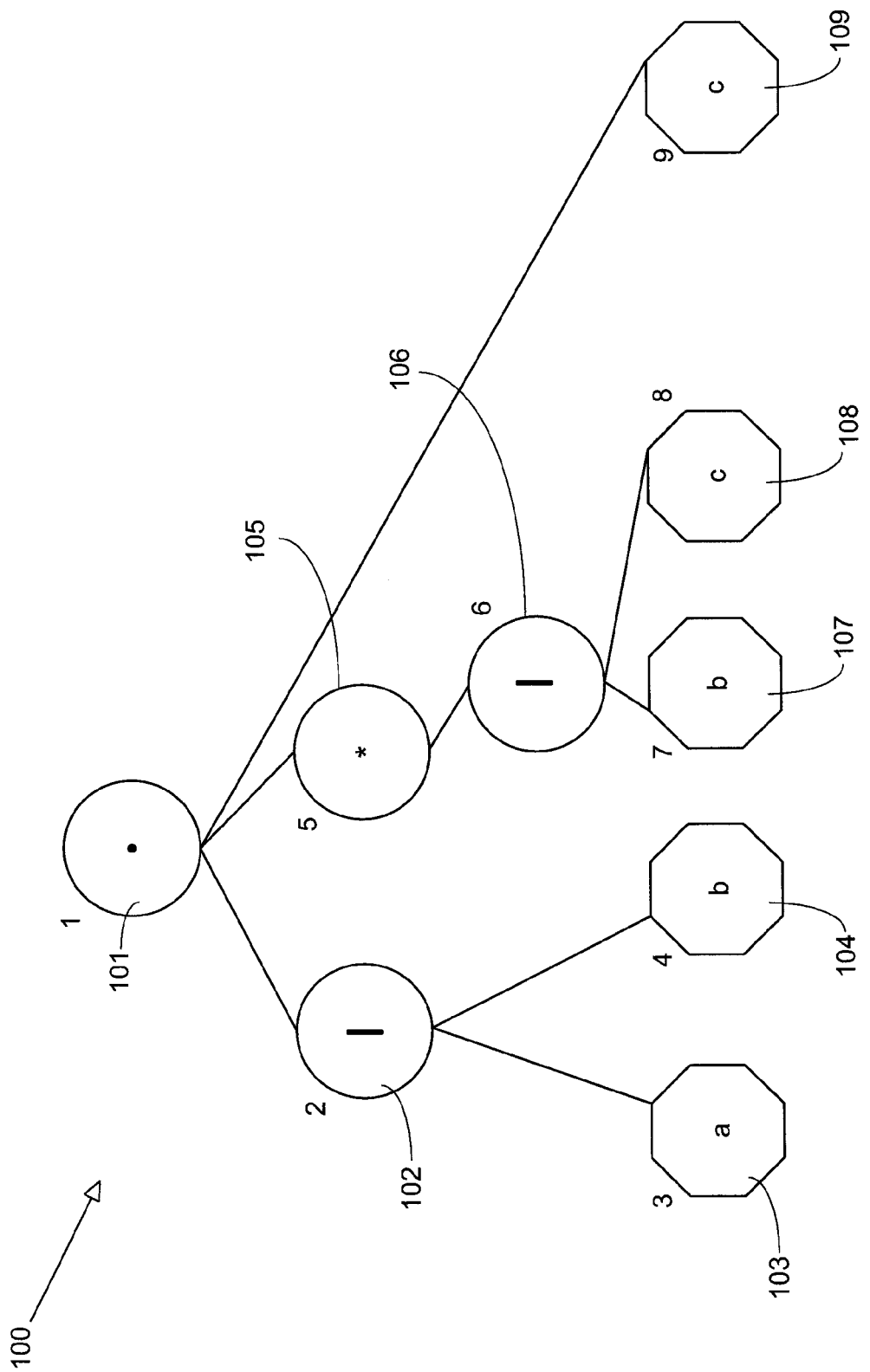
FIG. 1 is an example of a regular expression represented as an expression tree used in the present invention.

An example of an expression tree representing the regular expression "(a|b)(b|c)*c" is given in FIG. 1. The expression tree 100 of FIG. 1 has a root node 101 of the concatenation operator. The root node 101 has a first child node 102 of the alternation operator, and two leaves 103, 104 of characters a and b. The root node 101 has a second child node 105 of the Kleene closure operator and a grandchild node 106 of the alternation operator with leaves 107, 108 of the characters b and c. The root node 101 also has a direct leaf 109 of the character c. This example expression tree will be used to show a worked example of the described method with reference to FIGS. 10A to 10N described below.

Construction of the Minimized Deterministic FSA

During the course of the construction algorithm, a map is maintained of equivalence classes of nodes, used to identify situations where newly created nodes match existing nodes in the automaton graph and replace such nodes with their existing copies to preserve the minimality of the automaton. Non-matching nodes are automatically put in the map to be able to match nodes created later. The process of adding new non-looping nodes in this fashion is referred to as "integration" of nodes.

A map is also maintained of equivalence classes of "super-nodes", which are strongly connected components of the automaton graph. When a new cycle is created in the automaton it is minimized and checked for equivalence with an existing one. Again, equivalent supernodes are replaced with their existing copies. If a supernode is new, it is added to the supernodes map, and additionally every one of its nodes is put in the nodes map as they can be used to replace some non-looping nodes leading to the loop.

The integration procedure as it is used by the merging and loop attachment procedures is fully described below.

During the construction of the graph multiple temporary nodes and branches are created. The details of cleaning these temporaries are not specified, assuming that a garbage collection or a reference counting method is implicitly active to handle this task.

The diagrams below make heavy use of the Java (Java is a trade mark of Sun Microsystems, Inc.) reference conventions. Objects are passed by reference and are thus modified by the functions being called. Modifications of the same instance of an object are also reflected in all places where it is referenced (in lists, maps, etc).

The Construction Procedure Takes Three Parameters:
current node in the regular expression tree;
current Kleene closure depth;
current tail node.

The process starts with the creation and integration of a terminator node which is a simple final node with no outgoing transitions. The building procedure is then started at the root of the regular expression tree with this terminator and the depth set to 0.

Figures 2A, 2B:
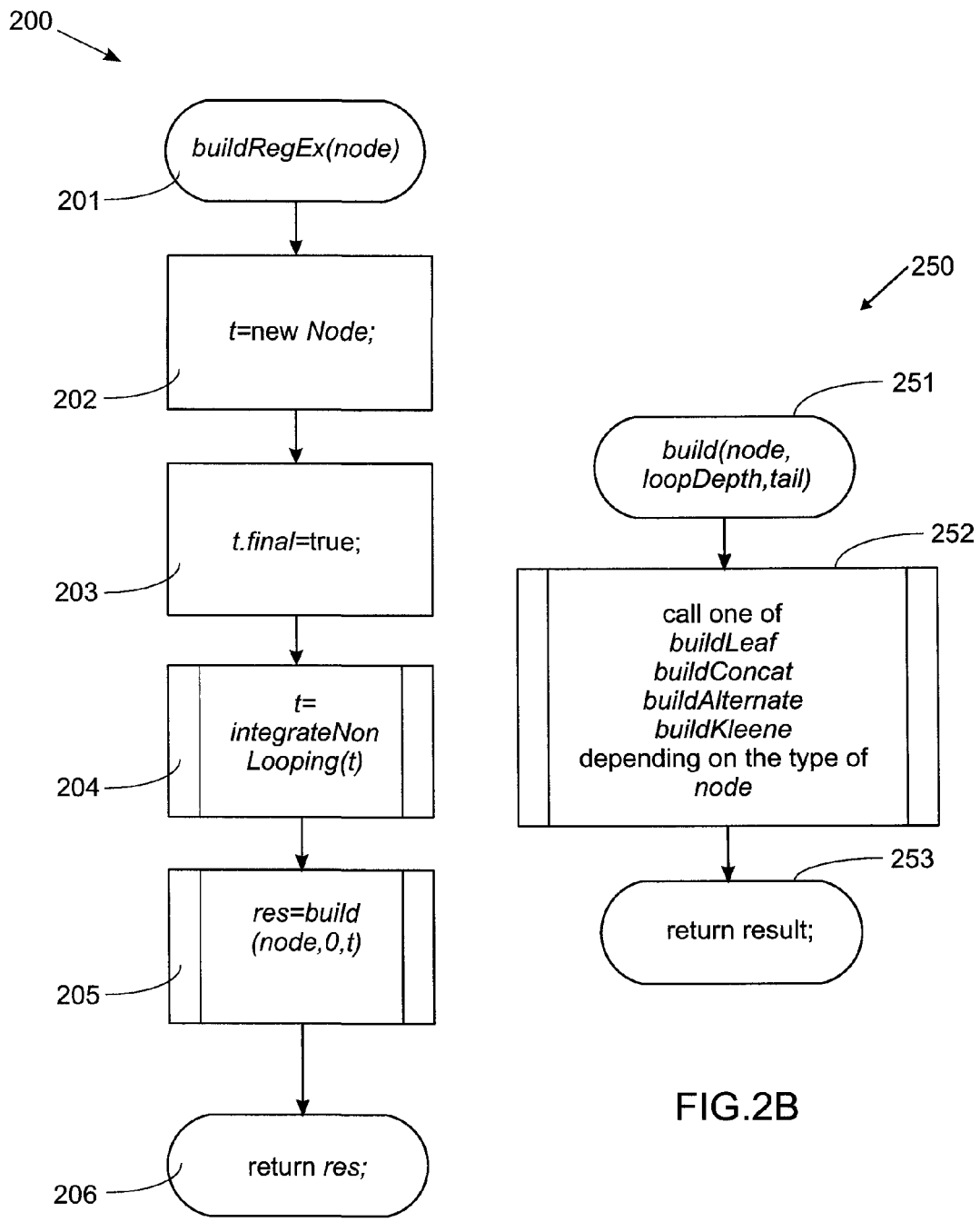
FIG. 2A is a flow diagram of a build function for a regular expression in accordance with the present invention.
FIG. 2B is a flow diagram of construction functions for operations called by the build function of FIG. 2A.

Referring to FIG. 2A, a flow diagram 200 shows the function "buildRegEx" which is the main function of the method. The flow diagram 200 takes one argument: a node specifying the root of the regular expression tree, and constructs a deterministic finite state automaton corresponding to it.

The flow starts with buildRegEx(node) where a new node of the automaton is created 201 and assigned 202 to the variable "t". The node "t" is marked 203 as a final node. The node "t" is integrated in the existing automaton by calling the function 204 "integrateNonLooping". The construction of the automaton is carried out by the function 205 "build", using the regular expression root node "node", loop depth 0, and tail node "t" as arguments. Finally, the result of the "build" function is returned 206 as the result of the function call.

Referring to FIG. 2B, the "build" function is shown 250. The function build takes three parameters 251: node in the regular expression tree; loop depth; tail node to attach at the end of the built automaton. The relevant construction function 252 is called depending on the type of regular expression node. The result of the relevant function is returned 253 as the result of build.

Character Transition

For a character transition the build procedure creates a new node with a single transition pointing to the tail node. The node is then integrated and returned.

Referring to FIG. 3A, the "buildLeaf" function is shown 300. The function "buildLeaf" processes character transitions and attaches them to the already built "tail" automaton.

A new node is built 301 and assigned to the variable "n" 302. The new node is adjusted 303 to contain a transition using the given "character" to the "tail" sub-automaton. The newly created node "n" is integrated 304 with the existing automata structure to remove all redundancies and maintain its minimality using the "integrateNonLooping" function.

The automaton starting with the new node "n" is returned 305 as the result of the operation.

Referring to FIG. 3B, the function "integrateNonLooping" is shown 350 which integrates 351 a node that cannot be part of a loop to the existing automata structure. To do this, it is checked 352 if the map "matchMap" contains a copy of the node. If it does not, the new node is added 353 to the "matchMap" map (so that nodes created later can be mapped to it). If it does, the new node is discarded 354 and replaced by the already existing copy. The result (the unique instance of a node with the given outgoing transitions, finality and loop marker in the graph) is returned 355.

Concatenation

In the case of a concatenation operation, the procedure processes the sub-trees of the graph starting with the last one. The building procedure is called to the last argument of the operation with the supplied tail and loop depth. The newly created node then becomes the tail. The build procedure is called for the previous argument of the concatenation and so on until the first argument is processed. The new tail is returned as the result of the build procedure for the concatenation.

Figure 4:
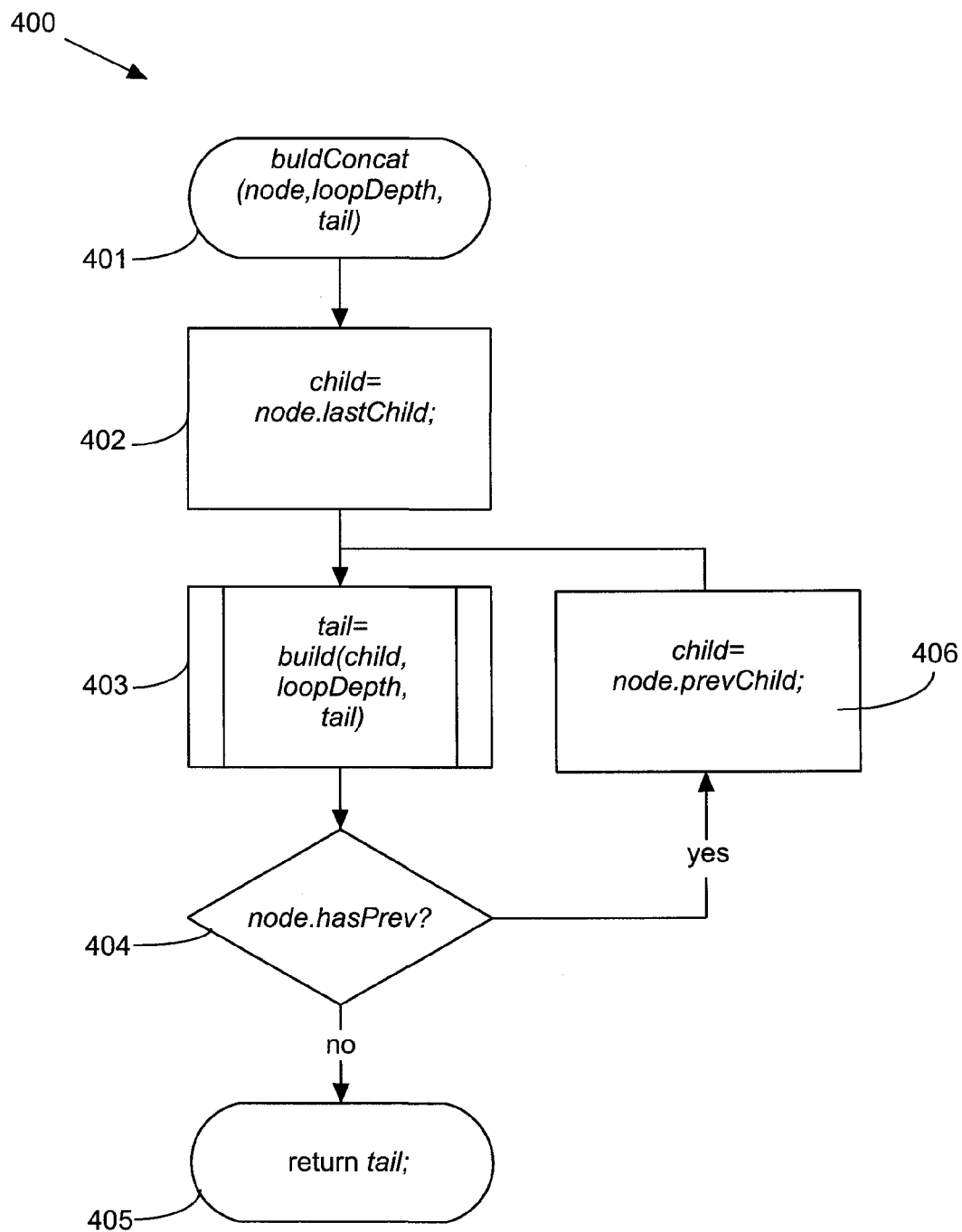
FIG. 4 is a flow diagram of processing a concatenation operation in accordance with an aspect of the present invention.

Referring to FIG. 4, the function "buildConcat" 400 is shown, which constructs automata for the concatenation operation.

The procedure starts 401 with the last child of the concatenation operation, loaded in the "child" variable 402. The function 403 "build" is called recursively to construct the sub-automaton corresponding to the current "child". The newly constructed sub-automaton becomes the "tail" for the next operation. It is checked 404 if the concatenation operation has any more children. If it has not, the current "tail" is returned 405 as the result of the construction. If it has, the procedure continues by moving 406 to the next child (in reverse order) and returning to step 403.

Alternation

The alternation operation is implemented using a FSA merge algorithm described further below in relation to FIGS. 7A and 7B. The build procedure is called recursively to construct a sub-automaton for the last argument of the operation (the result automaton). The build procedure is called again for the previous argument (with the same tail and depth value) to obtain the argument sub-automaton. A new result automaton is then constructed by merging it with the argument automaton. The last two steps are repeated until the first argument is processed. Finally, the result automaton is returned.

Figure 5:
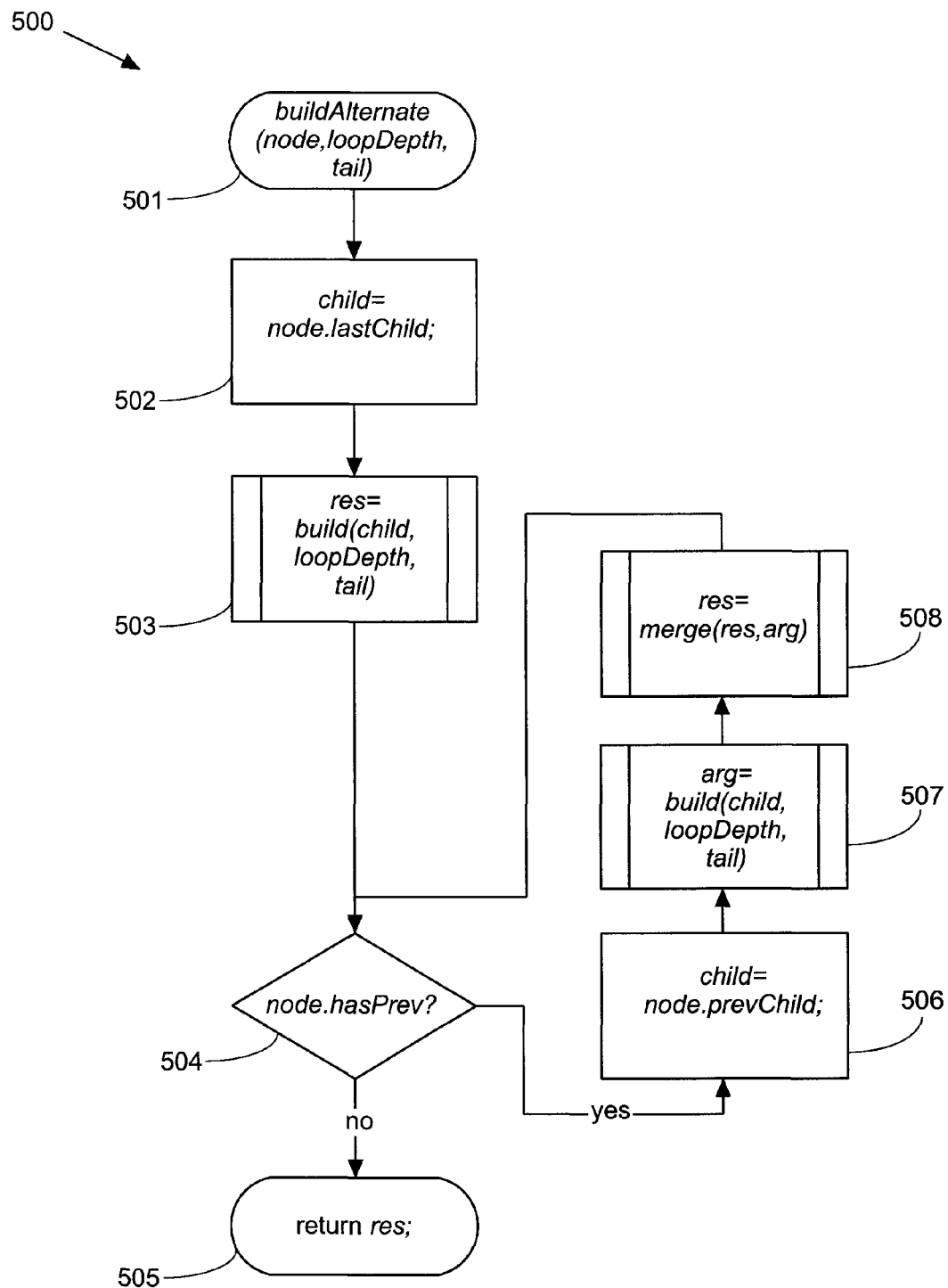
FIG. 5 is a flow diagram of processing an alternation operation in accordance with an aspect of the present invention.

Referring to FIG. 5, the procedure 500 "buildAlternate" constructs automata corresponding to the alternation operation. It again starts 501, 502 by taking the last argument of the operation. The function 503 "build" is called recursively to construct the sub-automaton corresponding to the child's branch of the regular expression tree. The result is put in the "res" variable.

It is checked 504 if there are any other children to the alternation operation. If there are not, the sub-automaton constructed in "res" is returned 505. If there are, "child" is moved 506 to the next child of the operation (in reverse order). The "build" function 507 is recursively called again to construct the automaton corresponding to the new "child" (using the same "tail" automaton). The result is put in "arg".

The function "merge" is then called 508 to combine two sub-automata: "arg", which contains the new child, and "res", which contains the combination of all other children processed so far. The combination is set as the new "res" sub-automaton.

Kleene Closure

The Kleene closure operation is implemented using the loop creation algorithm, described below in relation to FIGS. 8A and 8B, which makes multiple calls the FSA merge procedure. On a Kleene closure node, the build procedure first creates a terminator node which is non-final node with no transitions and a loop mark set defined as a singleton containing the current Kleene closure depth. It then makes a recursive call to build a sub-automaton for its argument, using this terminator and the Kleene depth increased by one. The sub-automaton is then merged with the automaton starting with the given tail. Finally, the loop marks are converted to actual loops using the loop creation algorithm below. The resulting automaton is returned.

Figure 6:
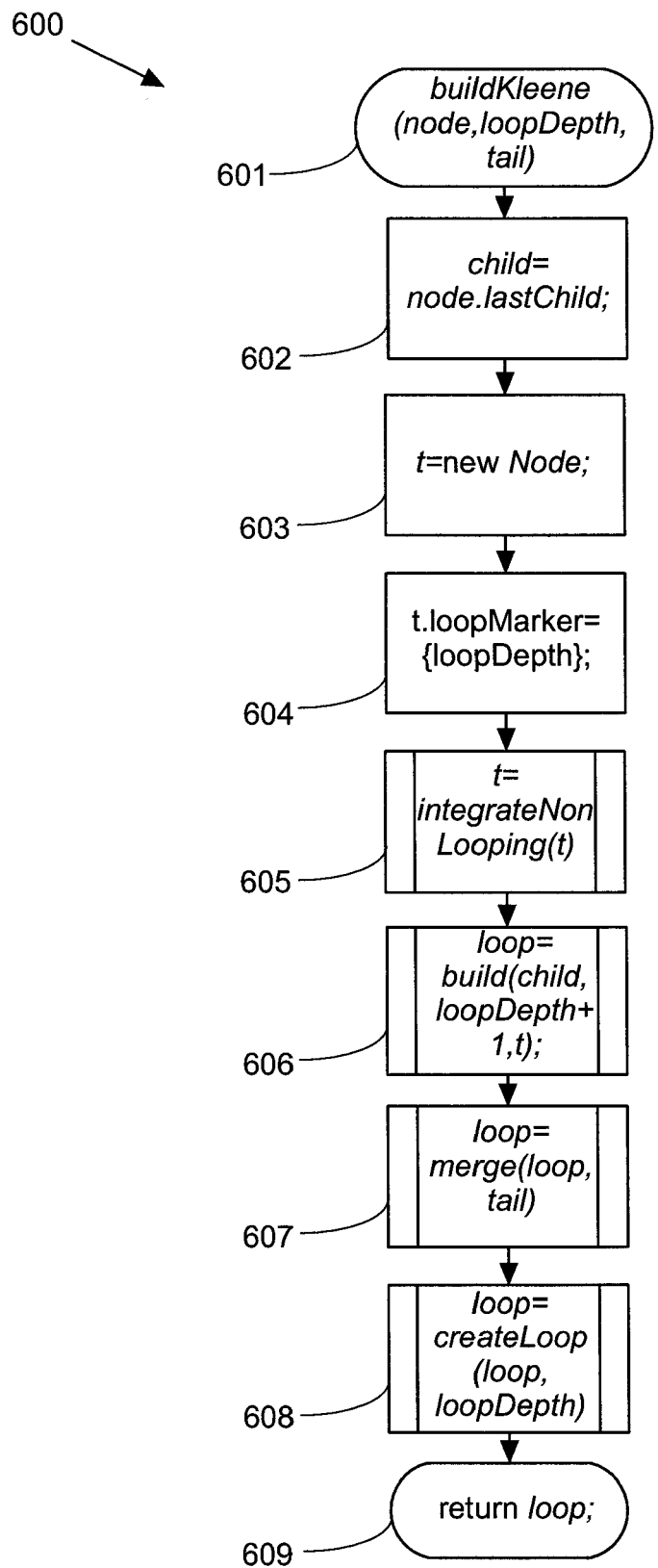
FIG. 6 is a flow diagram of processing a Kleene closure operation in accordance with an aspect of the present invention.

Referring to FIG. 6, the function 600 "buildKleene" is shown, which creates an automaton corresponding to a Kleene star operation (looping).

The flow starts 601 and the variable "child" is set to point 602 to the last (and only) child of "node". A new automaton node is created and the variable "t" is set to point to it 603. The loop marker field of the new node is set 604 to the singleton set with the value of "loopDepth". The node is integrated in the existing automaton by calling the function 605 "integrateNonLooping".

The function 606 "build" is called to create a sub-automaton corresponding to the argument of the Kleene star operation (pointed to by "child"). This automaton is built with an incremented "loopDepth" and using the newly built node "t" as tail. The result is an automaton that recognizes the child sub-automaton, terminating in nodes containing the "loopDepth" marker.

The function 607 "merge" is then called to combine the loop sub-automaton with the tail automaton. The result terminates either in final nodes, or in nodes containing loop markers equal to or smaller than "loopDepth".

In this step the function 608 is called to replace all instances of "loopDepth" among the loop markers with a backwards reference to the start of the automaton, creating copies and resolving conflicts where needed. The result of this function call is returned 609.

In-Place Merge Algorithm

The in-place merging of branches of the automaton is achieved using a specialization of a minimal FSA merge algorithm. It is applied fully in-place, thus it only processes sections of the graph that are a combination of different non-empty nodes from the source branches.

Figure 7A:
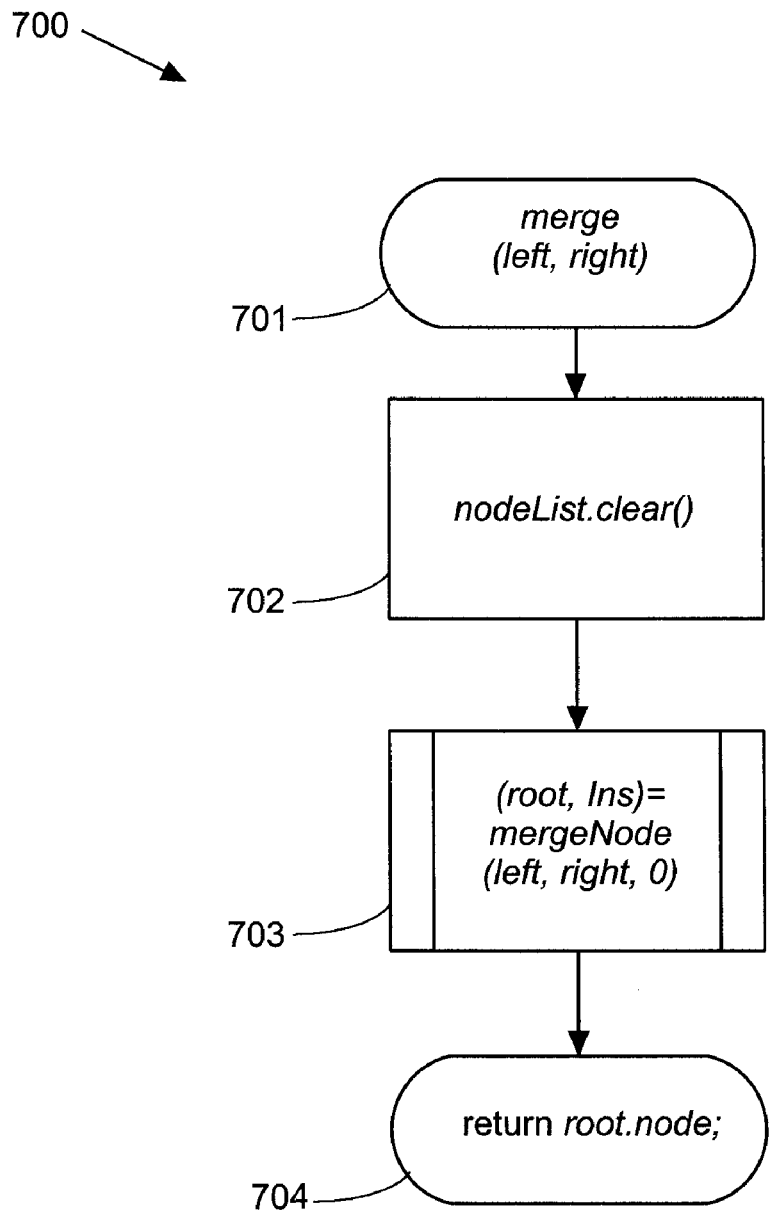
FIGS. 7A and 7B are flow diagrams of a merge function used in the flow diagrams of FIGS. 5 and 6 in accordance with an aspect of the present invention.

Referring to FIG. 7A, the function 700 "merge" is shown which performs union of two automata in the same automata space. It takes as arguments 701 the starting nodes of both automata. It starts 702 by clearing its "nodeList" map. Then calls the recursive function 703 "mergeNode" with the two nodes and a recursion depth of 0. The node component of the returned pair is returned 704 as the result of the function call.

Figure 7B:
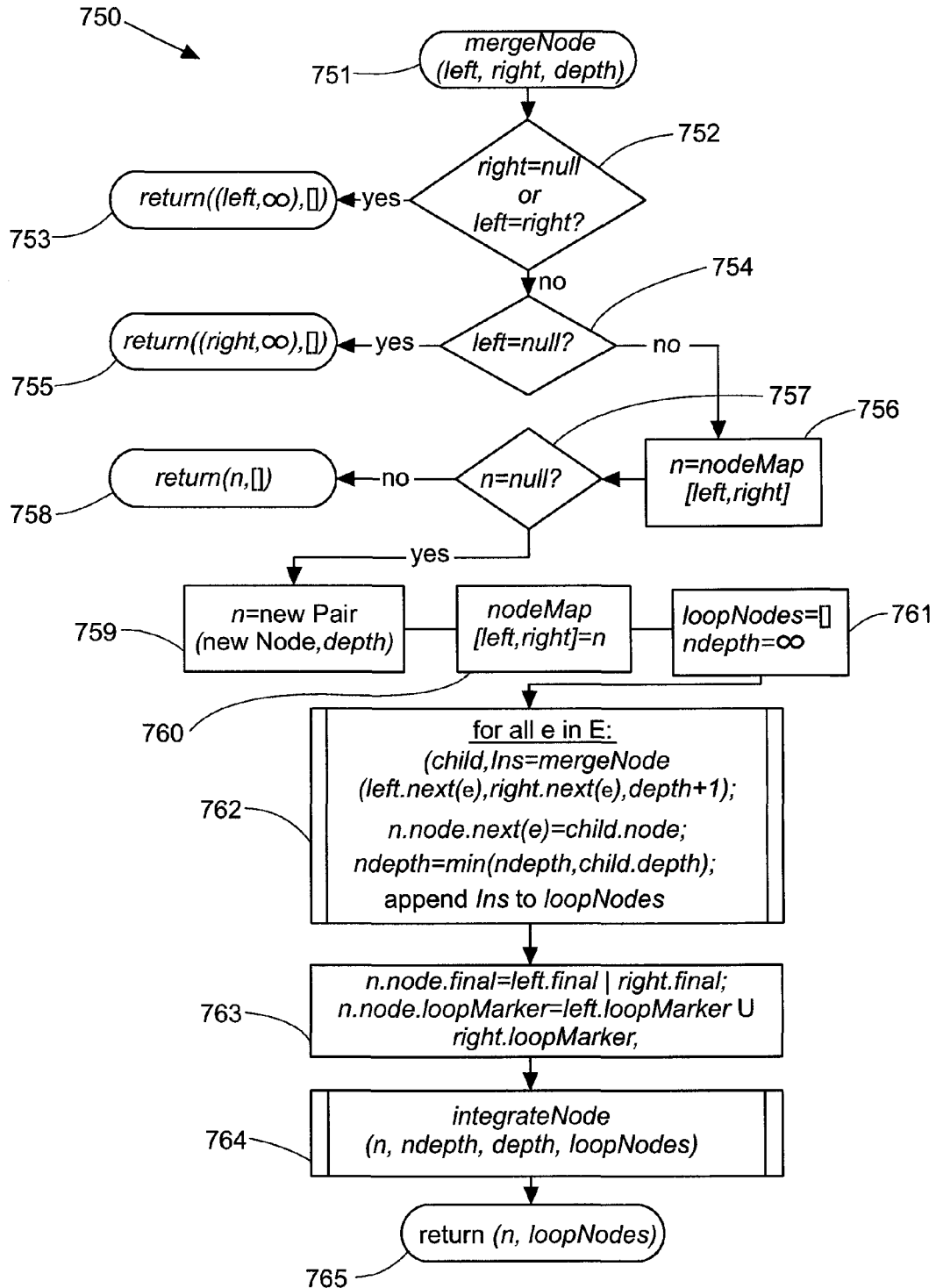

Referring to FIG. 7B, the recursive function 750 "mergeNode" is shown which performs automata union by visiting all reachable pairs of nodes from the two automata, creating combination nodes, and using the "integrateNode" function to maintain the minimality of the automaton structure.

The function starts 751 by checking 752 if the two arguments refer to the same automaton or if the right automaton is empty. If so, the function simply returns 753 the left automaton (which is already minimal). If not, the function then checks 754 if the left automaton is empty. If so, it simply returns 755 the right automaton (which again is already minimal).

If not, the function checks 756, 757 if the map "nodeMap" already contains an entry for this pair of nodes. If it does, the function returns 758 the existing entry. If it does not, a new pair consisting of a new node object and the value of the current recursion depth is created 759. This new pair is assigned 760 as the "nodeMap" image of the combination of the two nodes "left" and "right". The "loopNodes" list is initialized 711 as empty, and the reached depth "ndepth" as infinity.

For each transition character "e" in the alphabet "E" the function 762 calls itself recursively with the children of both nodes according to this transition, and incremented depth. The results of this call are used to fill in the transitions from the new node "n.node", and to compute the minimum reached depth "ndepth" and list "loopNodes" of nodes in the current loop.

After processing all transitions, the node's finality and loopMarker fields are set 763 as the union of the respective fields of the two source nodes.

Finally, the function 764 "integrateNode" is called, using the reached depth "ndepth" and "loopNodes" list collected, to integrate the new node and maintain the minimality of the constructed automaton.

The resulting node and depth pair "n" and the list "loopNodes" are returned 765 as the result of the function.

Loop Creation Algorithm

To attach the ends of a loop the algorithm described below is used. The procedure walks the trie and creates images of every node it visits. If the node is marked as a loop end, it is first merged with the root of the loop, the loop marker is removed, and its image is associated with both the original and merged node.

When the walking procedure meets a node that already has an image, the reference to that node is replaced by a reference to its image. As the graph is kept minimal during the whole process, the new branches that get created whenever a loop marker is met refer to more and more nodes from the original loop and/or nodes that have been already built and have an image assigned, until finally nothing that is completely new can be obtained.

Every time the processing of an image node is completed, the same scheme as in the algorithm above is applied to integrate it in the minimized graph. During the recursion only the nodes that are partially processed are not part of the minimized graph, and at the end of the recursion all image nodes are fully integrated and the resulting graph is minimal.

Figure 8A:
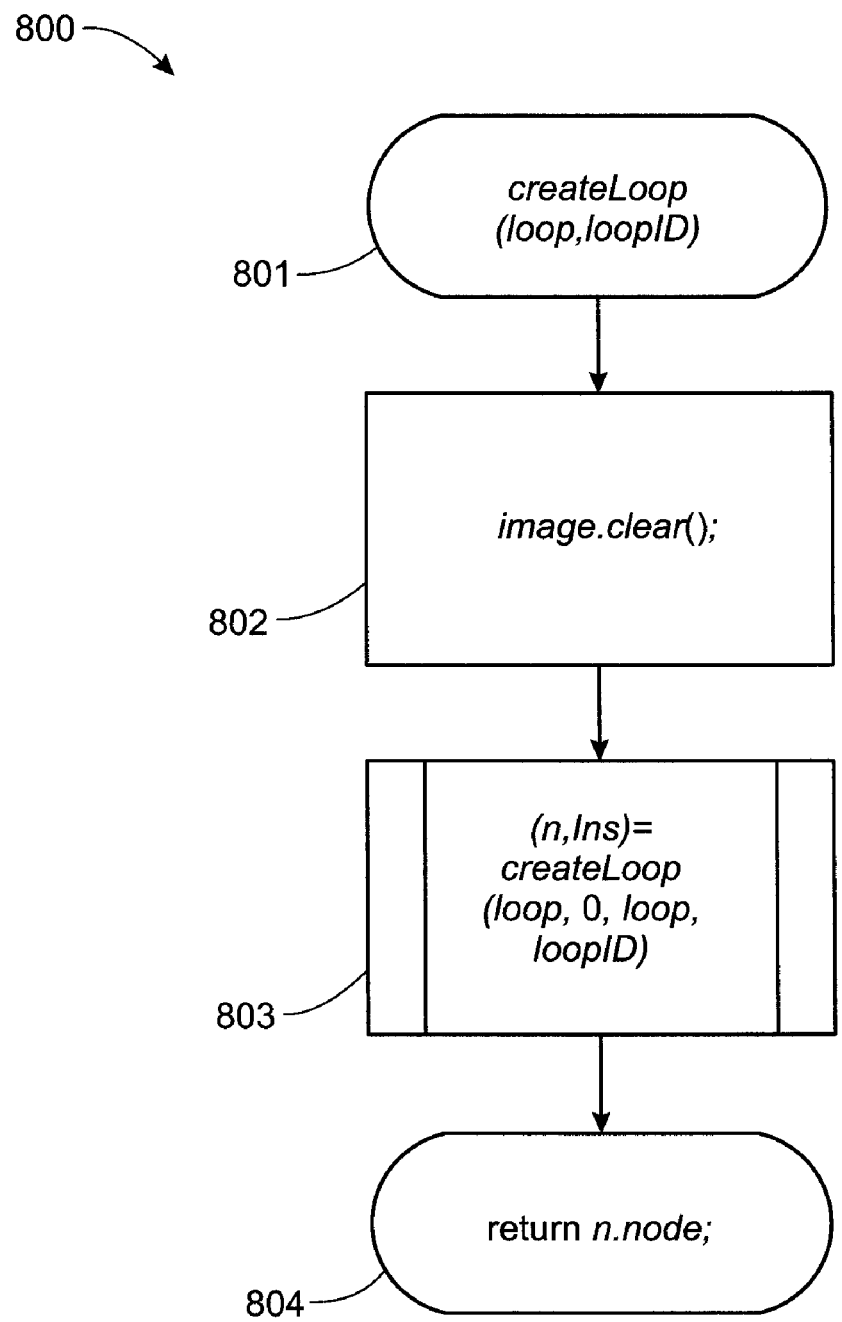
FIGS. 8A and 8B are flow diagram of a loop creation function used in the flow diagram of FIG. 6 in accordance with an aspect of the present invention.

Referring to FIG. 8A, the function 800 "createLoop" is shown which takes two parameters 801: the starting node of the loop, and the loop marker of the loop's ending points. It replaces all instances of the marker with a copy of the entire loop.

The procedure starts 802 with clearing the image map. After that the recursive function 803 "createLoop" is called using "loop" as both its "node" and "loop" parameters, a "depth" of 0, and the "loopID". Finally, the node component of the result is returned 804.

Figure 8B:
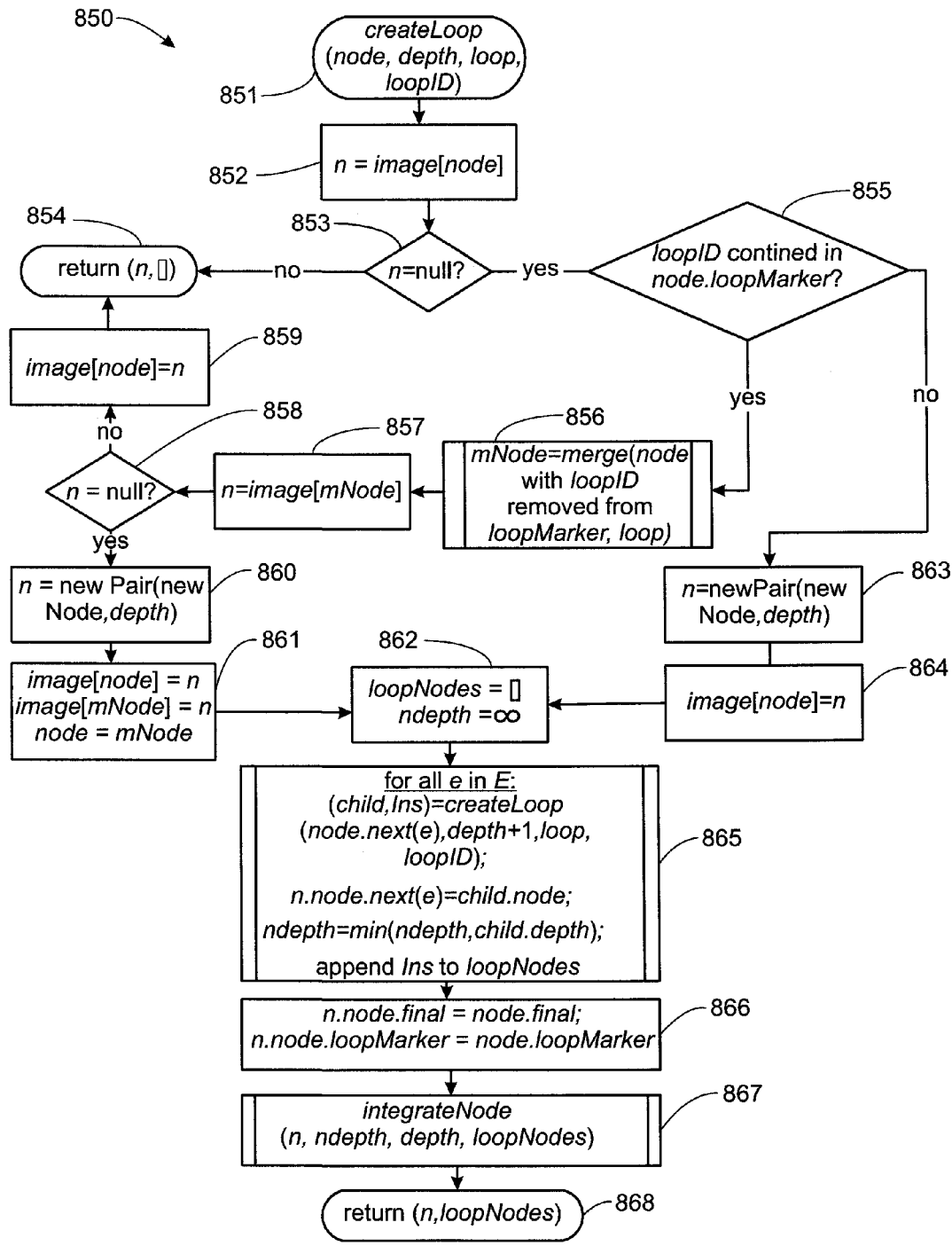

Referring to FIG. 8B, the recursive "createLoop" function 850 is used to visit all nodes in the loop graph and transform them to insert copies of the loop whenever "loopID" is found among the loop markers of a node.

The procedure starts 851, 852 by checking 853 if the current node is already in the "image" map, i.e. if the node is already visited by another call of the function. If it is, the function simply returns 854 the existing assignment of the node.

If it is not, the node's loop marker is examined 855 to see if it contains the marker "loopID". If it does, the function 856 "merge" is used to combine the node (minus the "loopID" loop marker) with the entire loop. The merging process minimizes on the fly, thus it adds extra nodes only if they are needed, eventually leading to a situation where no new nodes are created and all nodes of the combined sub-automaton are already in the "image" map.

It is checked 857, 858 again if the combined sub-automaton is already in the "image" map. If it is, the original node is assigned 859 the same image as the combined one, and the image is returned 854 as the result of the function. If it is not, a new pair consisting of a new node and the value of the variable "depth" is constructed 860. The new node is assigned as the image of both the original node "n" and the combined node "mNode". The variable "node" is reassigned 861 to point to the combined node "mNode".

The "loopNodes" list is initialized 862 as empty, and the reached depth "ndepth" as infinity.

Going back to step 855 where the node's loop marker is examined to see if it contains the marker "loopID". If it does not, a new pair consisting of a new node and the value of the variable "depth" is constructed 863. The image of the argument node is assigned 864 to this newly created pair. The "loopNodes" list is initialized 862 as empty, and the reached depth "ndepth" as infinity.

For all possible transition characters "e" in the alphabet "E" where the node "node" has a valid transition, the function 865 calls itself recursively with the destination of the transition, incremented depth, the same loop start node, and the same loop identifier. The result of this call is used to create a transition from the newly created node "n.node" with the same character, to update the minimum reached depth "ndepth", and to add to the list "loopNodes" of nodes in the current loop.

After processing all transitions, the finality and loopMarker fields are assigned 866 according to their values in "node".

Finally, the newly created node is integrated 867 with the automaton using the function "integrateNode" with the parameters "ndepth" and "loopNodes" gathered at step 865.

Finally, the new node and depth pair "n" and the "loopNodes" list are returned 868 as the result of the function call.

Node Integration

Figure 9:
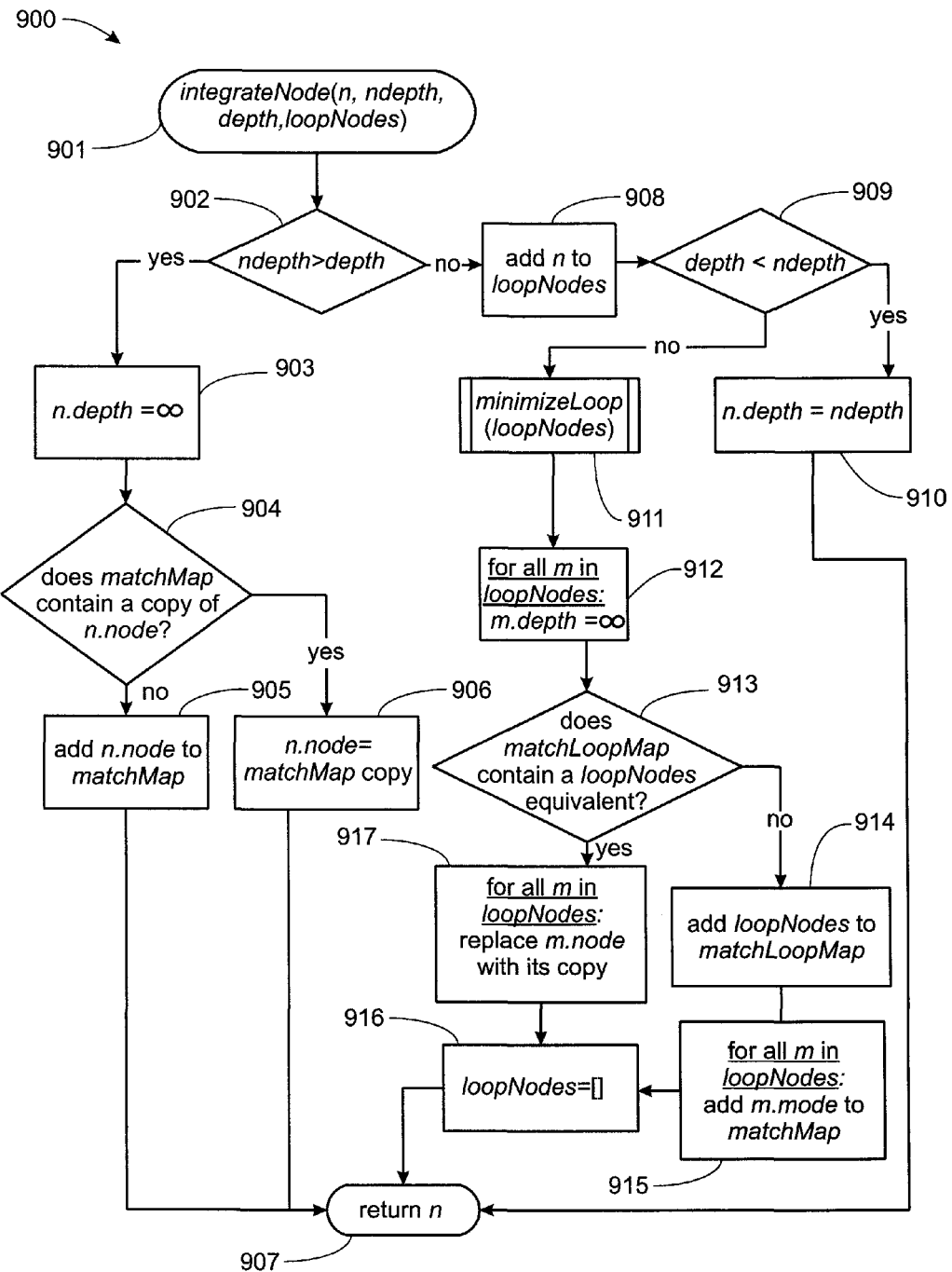
FIG. 9 is a flow diagram of node integration in accordance with an aspect of the present invention.

The flowchart shown in FIG. 9 describes the integration procedure. It makes use of automaton minimization function which is not specified in this disclosure. Any minimization algorithm may be used, but the function must obey the following:

Nodes with different loopMarker must be treated as different;

Transitions outside the given set of nodes must be treated as fixed;

The function takes as argument a list of items containing a node field. It must maintain the mapping between the item and the resulting node, i.e. if it is given multiple different items that it minimizes to the same node, it modifies the list to contain only one of them, but it also takes care to modify the node field of all the other items to point to the same node.

The integration procedure uses the depth and ndepth parameters to classify the new node in three possible categories:

non-looping node, which is integrated by looking if it can be replaced by a copy in the match map;

looping node that is not the entry point of the current strongly connected component, which is just added to the current loop list;

entry point of the current strongly connected component, where the gathered strongly connected component is minimized and then integrated as a supernode.

Referring to FIG. 9, the function 900 "integrateNode" is shown which integrates nodes constructed by merging or loop creation into the existing automaton structure. It takes two depth values as parameters 901, "depth" (the recursion depth in the merge/loop procedure) and "ndepth" (the minimum recursion depth referred to by the node's children) to decide what action needs to be taken to preserve the minimality of the automaton, and a list "loopNodes" that contains nodes in the current loop whenever there is one, used and updated to keep track what section of the automaton is strongly connected with the current node to be treated as a single supernode.

It is checked 902 if the reached depth "ndepth" is higher than the recursion depth. If it is, the current node is non-looping, and can be integrated as in the "integrateNonLooping" function. Its depth is first marked 903 as infinity to mark it as fully processed for any further references to the same note. It is then checked 904 if "matchMap" contains a copy of the node. If it does not, the new node is added 905 to "matchMap" to ensure equivalent nodes created later can be replaced by it. If it does, the new node is discarded and replaced by its equivalent from "matchMap" 906.

The (node, depth) pair "n" is returned 907 as the result of the function.

If the reached depth "ndepth" is not higher than the recursion depth at step 902, the node is part of a loop, and is thus added 908 to the loopNodes list. It is now checked 909 if the reached depth "ndepth" is smaller than the recursion depth "depth". If it is, the new node is not the last element in the current loop. The node's depth is modified 910 to the reached depth "ndepth" and the function returns 907 (having also updated "loopNodes").

If the reached depth "ndepth" is not smaller than the recursion depth "depth" at step 909 ("ndepth" matches "depth"), the current node is the last in the loop, thus "loopNodes" now contains the whole strongly connected component. The function 911 "minimizeLoop" is then called to perform minimization of the loop (the actual method of minimization is not specified in this disclosure). The depth of all elements in the "loopNodes" list is then set 912 to infinity to mark them as processed.

It is then checked 913 if the "matchLoopMap" map contains an equivalent to the new loop. An equivalent can be another loop in the automaton where there is a one-to-one mapping of the nodes which makes the two loops identical. An equivalent may also be a section of an existing loop.

If such an equivalent does not exist, the new loop is added 914 to "matchLoopMap" to make sure new equivalents can be mapped to it later in the process. Additionally, all nodes in the loop are added 915 to the "matchMap" map to make sure nodes going into the loop can be replaced by equivalents inside the loop. The "loopNodes" list is cleared 916.

If such an equivalent exists, all nodes in the "loopNodes" list are discarded and replaced by their equivalent nodes from the matching loop 917. The "loopNodes" list is cleared 916.

After the "loopNodes" list is cleared 916, the (node, depth) pair "n" is returned 907 as the result of the function.

EXAMPLE

The regular expression tree shown in FIG. 1 and described above, corresponds to the expression "(a|b)(b|c)*c" (which can be expanded to "(a|b)·(b|c)*·c").

As described above, the expression tree 100 of FIG. 1 has a root node 101 of the concatenation operator. The root node 101 has a first child node 102 of the alternation operator, and two leaves 103, 104 of characters a and b. The root node 101 has a second child node 105 of the Kleene closure operator and a grandchild node 106 of the alternation operator with leaves 107, 108 of the characters b and c. The root node 101 also has a direct leaf 109 of the character c. The nodes 101 to 109 of the expression tree 100 are referred to below as expression nodes 1 to 9. This example expression tree will be used to show a worked example of the described method.

The steps taken to construct the minimal deterministic finite state automaton recognizing this language are described below as a worked example with reference to FIGS. 10A to 10N which show the states (shown as nodes) and transitions (shown as connecting arrows) of the FSA.

Figure 10A:
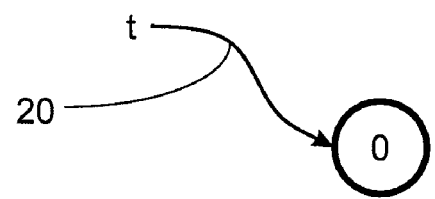
FIGS. 10A to 10N are diagrams showing a worked example of the building of a finite state automaton in accordance with the present invention.

The procedure starts as shown in FIG. 10A with the creation and integration of a terminator node 0, an empty final node, with a tail pointer 20 pointing to it.

The build procedure is then called for expression node 101 with tail (0) and loop depth (0). The operation specified by the current root node is concatenation. The build thus continues with its last argument, expression node 109 with the same tail and loop depth.

Figure 10B:
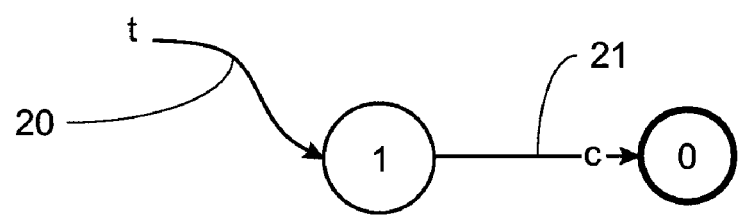

Expression node 109 is a character transition. Referring to FIG. 10B, the build procedure constructs a new node 1 and links it to the tail node 0 with a transition 21 with the character "c". The recursion then returns to continue the processing of expression node 101, which sets the result of the recursion as the new tail node 1.

Figure 10C:
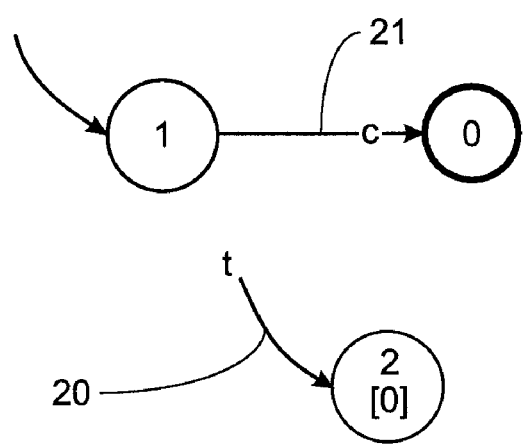

The next child of the concatenation to be processed is expression node 105, a Kleene closure. Referring to FIG. 10C, processing this operation starts by creating a terminator node 2 for the argument expression, with the tail pointer 20. The terminator node 2 is an empty node with a loop marker set consisting of the singleton [0], the current loop depth.

The build procedure is then called recursively to process the argument, expression node 106 with tail node 2 and loop depth 1.

Figure 10D:
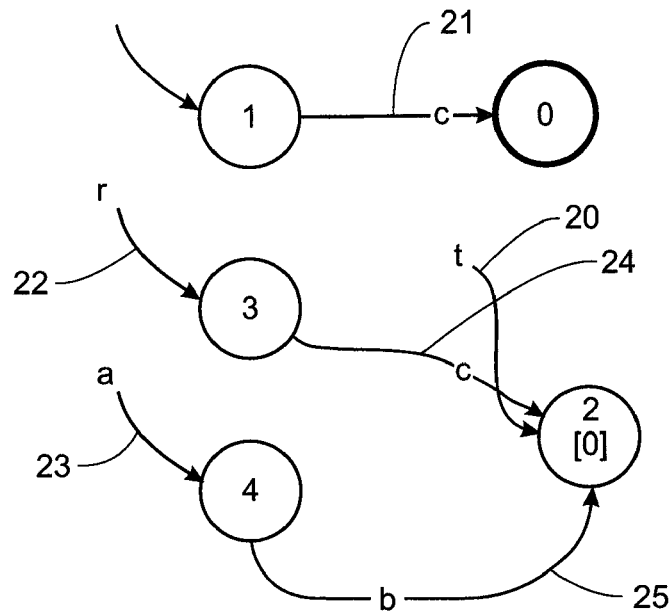

The operation specified by expression node 106 is alternation. Referring to FIG. 10D, the build procedure is called recursively to construct a result in the form of node 3 (pointed to by the r arrow 22 below) and argument in the form of node 4 (pointed to by the a arrow 23) automata for, respectively, expression nodes 108 and 107, with the same tail node 2 and loop depth (1).

The node 3 has a transition 24 linked to node 2 in the form of character "c" and node 4 has a transition 25 linked to node 2 of the character "b".

Figure 10E:
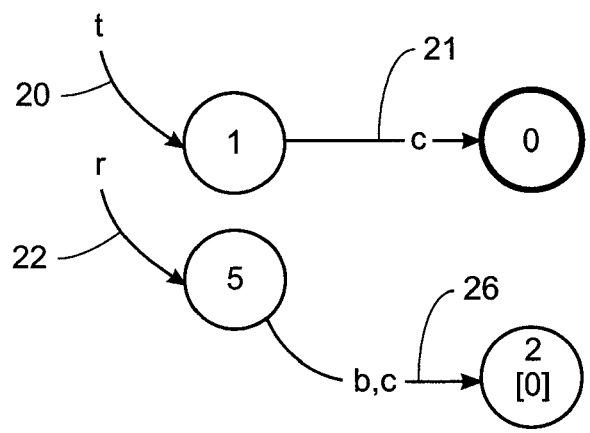

Referring to FIG. 10E, the two automata are then merged using the merge algorithm, quickly finishing in the shown configuration in which the result pointer 22 points to node 5 which has a transition 26 linking it to node 2 with characters "b,c". The tail pointer 20 again points to node 1. The construction of the argument to the Kleene closure operation 5 is complete.

Figure 10F:
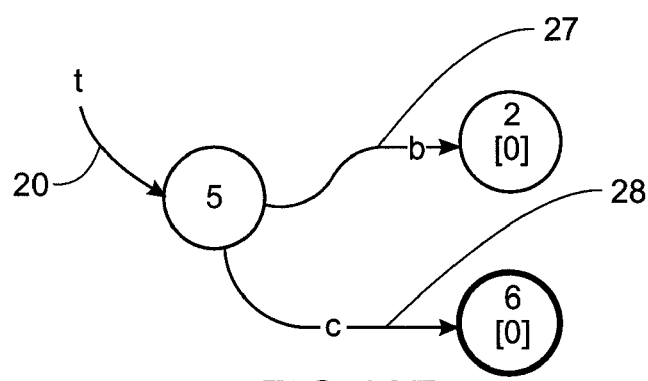

Referring to FIG. 10F, in the next step the argument and tail automata are merged to form the argument of the loop creation algorithm. This results in the tail pointer 20 pointing to node 5. Node 5 has a transition 27 linking it to node 2 with character "b". Node 5 also has a transition 28 linking it to node 6 with character "c".

Figure 10G:
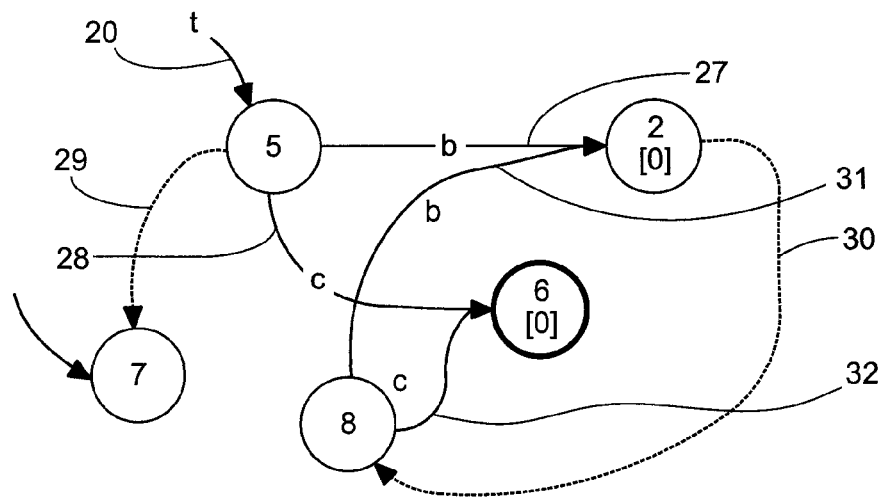

Referring to FIG. 10G, the loop algorithm starts by creating an image 7 for node 5 with an image link 29 (the link between the original and image is depicted in the dashed arrows in the figures). It starts building the transitions from the image starting with the transition to node 2.

This node contains the loop marker [0], thus an expanded copy of the node is created first by merging the sub-automaton starting there with the loop argument (starting with node 5) and removing the depth (0) from the node's loop marker set.

Figure 10H:
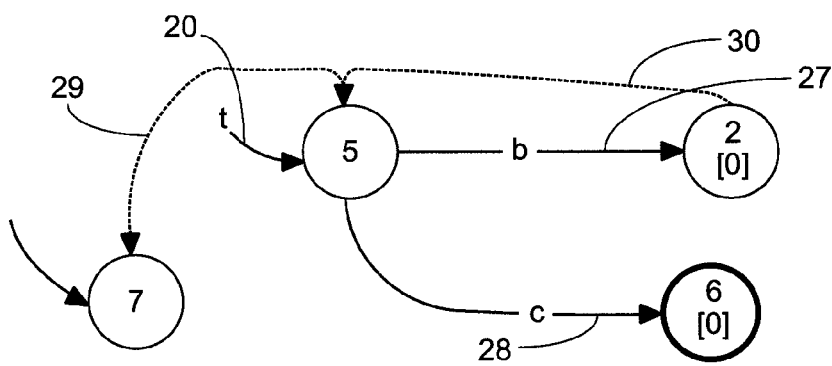

The resulting node 8 is a full copy of an existing node 5 with an image link 30 from node 2 to node 8, transition 31 from node 8 to node 2 of character "b" and transition 32 from node 8 to node 6 with character "c". Thus node 8 can be deleted and remapped to the existing node (this step is carried out during integration within the merge process) as shown in FIG. 10H. FIG. 10H shows node 8 removed and the image link 30 pointing from node 2 to node 5.

Figure 10I:
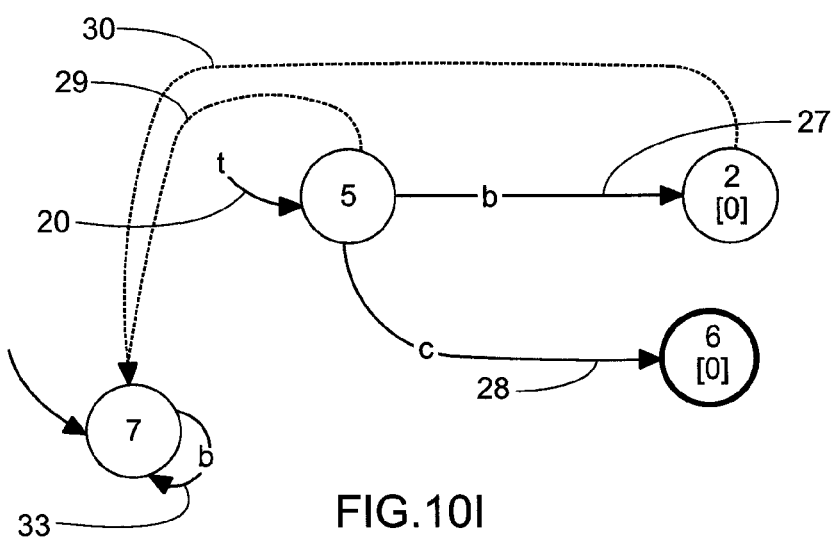

Referring to FIG. 10I, the expanded copy is a node which already has an image (image node 7), thus it is not needed to create a new one, and all links that would be created to it (the "b" transition 33 from node 7 and the image link 30 from node 2) are set to point to that image.

Figure 10J:
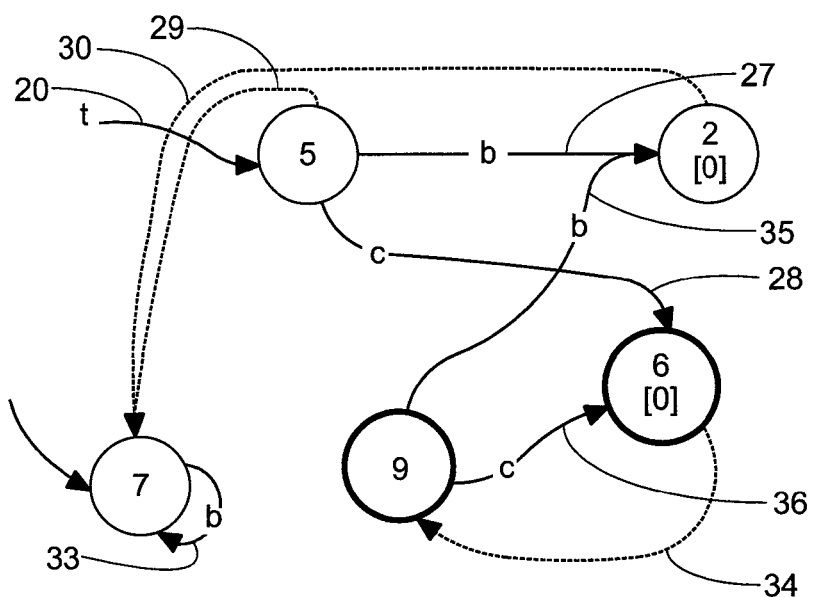

Referring to FIG. 10J, the process continues with copying the second transition 28 of node 5, "c" going to node 6. As this node 6 also contains the current loop depth marker, the expanded copy of node 6 is obtained by merging it with the loop argument (node 5). This time the result does not collapse as the new node 9 is final, and thus different from node 5. New node 9 has an image link 34 from node 6, transition 35 from node 9 to node 2 of character "b", and transition 36 from node 9 to node 6 of character "c".

Figure 10K:
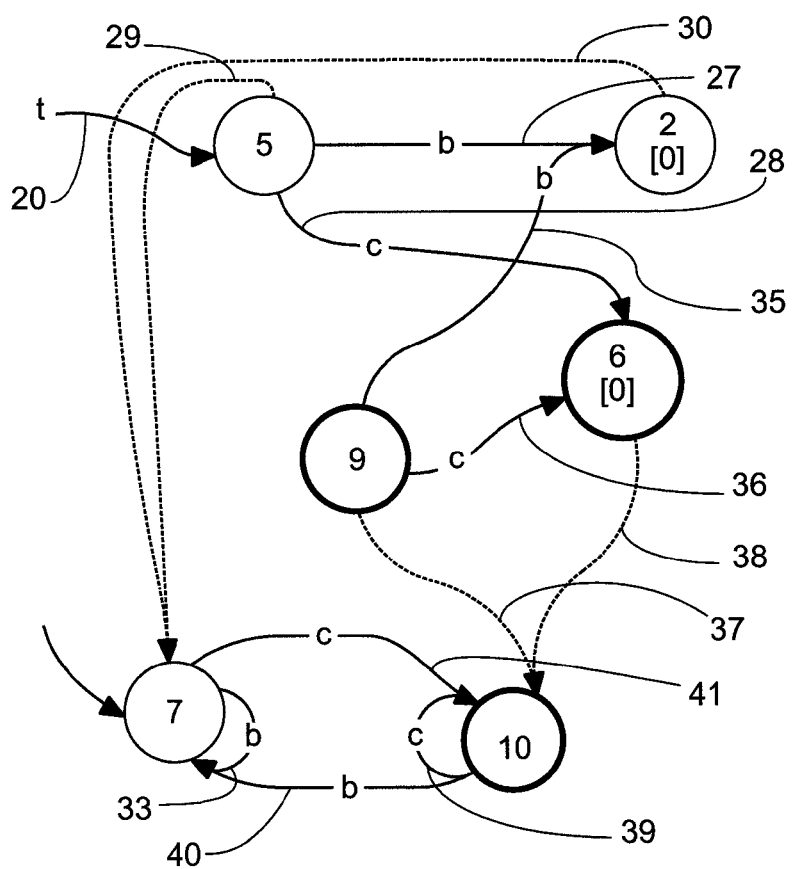

Referring to FIG. 10K, the transitions coming from node 9 are now processed to build an image node 10. The link "b" leads to a processed node 2, thus the transition is directly linked to its image node 7 and no further processing is necessary. Similarly, the link "c" is directly mapped to the target node 6's image node 10.

This results in new image node 10 having image link 37 from node 9 and image link 38 from node 6. Image node 10 includes a transition 39 to itself of character "c", a transition from node 10 to node 7 of character "b". Node 7 has a transition 41 to node 10 of character "c".

Construction of the image of node 6 is now complete. Its recursion depth is (1), but one of its links points to a node of lower recursion depth, thus this node is treated as a non-starting looping node, thus a reference to it is put in the current loop nodes list. With the transition "c" the construction of the image of node 5 is also complete. Its recursion depth is (0), and its links and children point at most to itself, thus this node is a starting looping node. It is put in the current loop nodes list, the latter (now containing [node 7, node 10]) is minimized (which does not change anything), and with that the construction of the image node 7 of the loop starting node 5 is finished. The full loop automaton is now complete and the nodes making up the argument as well as the temporary expanded node copies can be safely deleted.

Figure 10L:
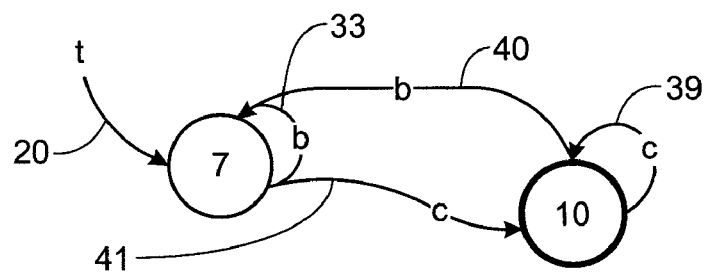

Referring to FIG. 10L this results in node 7 with the tail pointer 20, and terminal node 10. Transition 33 links node 7 to itself with character "b". Transition 39 links node 10 to itself with character "c". Transition 40 links node 10 to node 7 with character "b". Transition 41 links node 7 to node 10 with character "c".

Figure 10M:
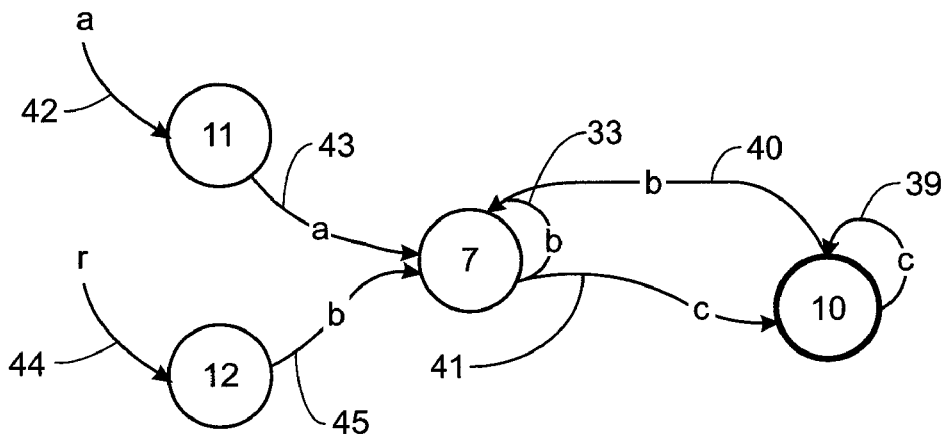
Figure 10N:
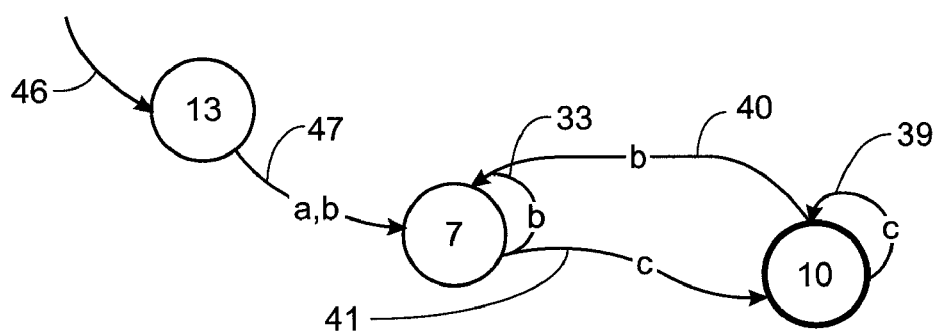

Backtracking to expression node 1 sets node 7 as the new tail node. Expression node 2 is alternation. The result and argument automata are constructed as shown in FIG. 10M. Node 11 has the argument arrow 42 pointing to it with transition 43 from node 11 to node 7 with character "a". Node 12 has the result arrow 44 pointing to it with transition 45 from node 12 to node 7 with character "b".

The result and argument automata are merged to form the final result of the alternation 2, concatenation 1 and the complete regular expression. This is shown in FIG. 10N with starting state 46 pointing to node 13 with transition 47 linking to node 7 with characters "a,b".

Figure 11:
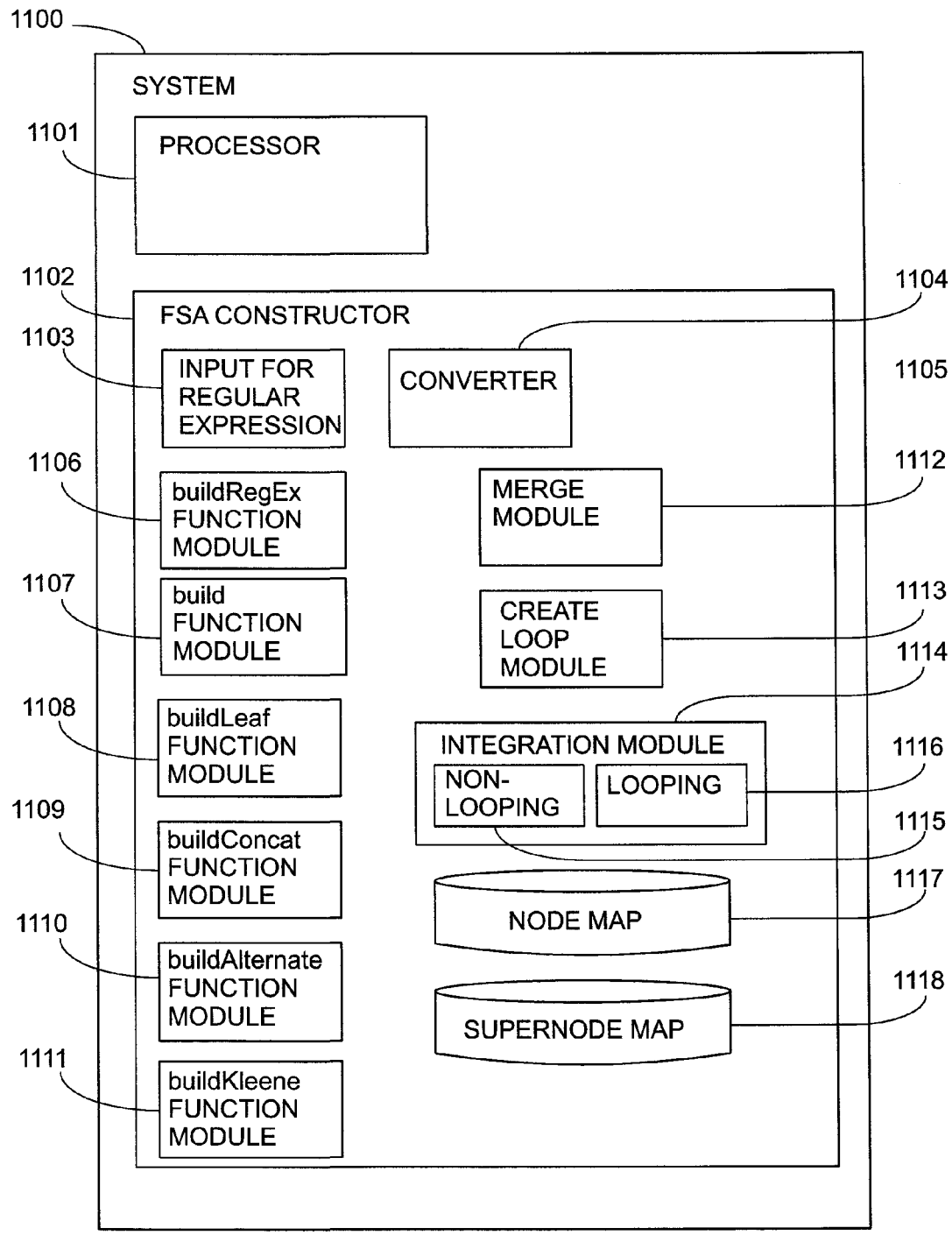
FIG. 11 is a block diagram of a system for construction of a finite state machine in accordance with the present invention.

Referring to FIG. 11, a block diagram shows a system 1100 in which the described method of the construction of minimal deterministic finite state automata (FSA) corresponding to regular expressions. The system has applications in many areas of computer science, including network firewalls, virus protection, natural language processing and biological computing amongst others.

The system 1100 includes a processor 1101 and an FSA constructor 1102. The FSA constructor 1102 includes an input 1103 for a regular expression and a converter 1104 of the regular expression to an expression tree.

The function modules include the following. A "buildRegEx" function module 1106 is provided for building a finite state automaton corresponding to the regular expression tree by preparing a terminator node and launching the recursive construction through the "build" function. A "build" function module 1107 is provided for each node which calls one of the construction function modules: a "buildLeaf" function module 1108, a "buildConcat" function module 1109, a "buildAlternate" function module 1110, or a "buildKleene" function module 1111.

In this way means are provided for traversing the regular expression tree recursively to build minimal FSAs corresponding to the branches of the tree with the FSAs ending in a specified tail automaton. In the described implementation, the traversal is done via "build" recursively calling itself. The "build" function calls "buildConcat/Alternate/Kleene" which call "build" on smaller branches of the input tree. The "buildRegEx" function module 1106 prepares and launches the traversal.

The "buildLeaf" function module 1108 builds nodes for character transitions. The "buildConcat" function module 1109 processes a concatenation operation. The "buildAlternate" function module 1110 processes an alternation operation. The "buildKleene" function module 1111 processes a Kleene closure operation.

In addition, there is a merge module 1112 for merging branches of the FSA being constructed and a create loop module 1113 for creating loops in the FSA being constructed. The merge module 1112 provides means for merging minimal automata which only process combinations of different non-empty nodes as part of the "buildAlternate" function module 1110 and the "buildKleene" function module 1111.

The FSA constructor 1102 also includes an integration module 1114 including sub-modules for non-looping 1115 and looping 1116 integration. Newly constructed nodes that do not belong to a strongly connected component are processed using the non-looping sub-module 1115. Newly constructed nodes that belong to a strongly connected component are processing using the looping sub-module 1116. The integration module 1114 compares and classifies nodes and supernodes (nodes collected together forming a strongly connected component) with existing nodes and supernodes stored in a node map 1117 and a supernode map 1118. Newly created nodes or supernodes which do not match existing nodes or supernodes in the maps 1117, 1118 are added to the maps 1117, 1118.

Figure 12:
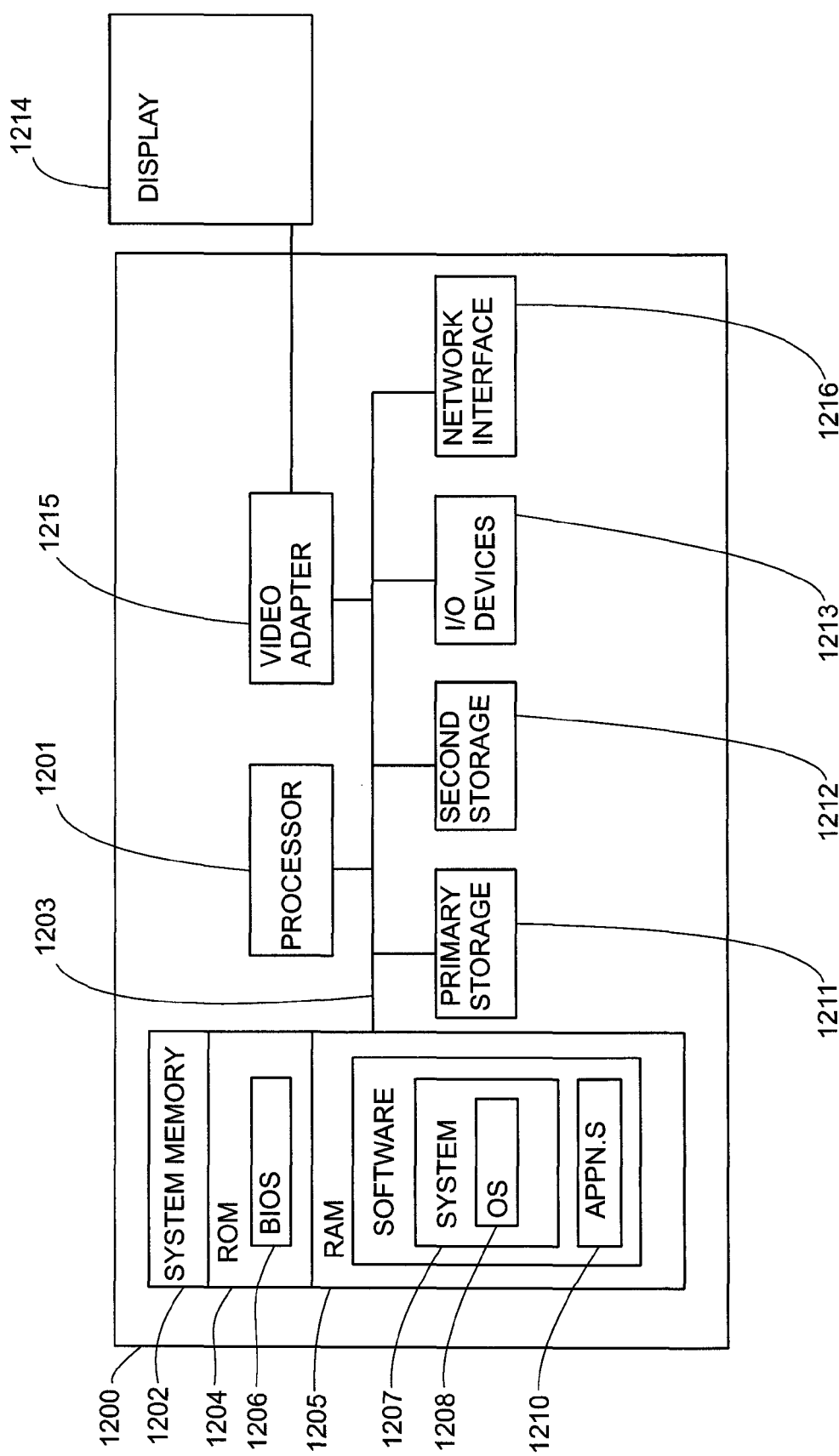
FIG. 12 is a block diagram of a computer system in which the present invention may be implemented.

Referring to FIG. 12, an exemplary system for implementing the invention includes a data processing system 1200 suitable for storing and/or executing program code including at least one processor 1201 coupled directly or indirectly to memory elements through a bus system 1203. The memory elements can include local memory employed during actual execution of the program code, bulk storage, and cache memories which provide temporary storage of at least some program code in order to reduce the number of times code must be retrieved from bulk storage during execution.

The memory elements may include system memory 1202 in the form of read only memory (ROM) 1204 and random access memory (RAM) 1205. A basic input/output system (BIOS) 1206 may be stored in ROM 1204. System software 1207 may be stored in RAM 1205 including operating system software 1208. Software applications 1210 may also be stored in RAM 1205.

The system 1200 may also include a primary storage means 1211 such as a magnetic hard disk drive and secondary storage means 1212 such as a magnetic disc drive and an optical disc drive. The drives and their associated computer-readable media provide non-volatile storage of computer-executable instructions, data structures, program modules and other data for the system 1200. Software applications may be stored on the primary and secondary storage means 1211, 1212 as well as the system memory 1202.

The computing system 1200 may operate in a networked environment using logical connections to one or more remote computers via a network adapter 1216.

Input/output devices 1213 can be coupled to the system either directly or through intervening I/O controllers. A user may enter commands and information into the system 1200 through input devices such as a keyboard, pointing device, or other input devices (for example, microphone, joy stick, game pad, satellite dish, scanner, or the like). Output devices may include speakers, printers, etc. A display device 1214 is also connected to system bus 1203 via an interface, such as video adapter 1215.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method of direct construction of a minimal deterministic finite state machine corresponding to a regular expression, comprising:
    providing a regular expression represented as a regular expression tree with nodes of operators and leaves of elementary character transitions;
    traversing the regular expression tree recursively to build minimal finite state automata (FSAs) corresponding to the branches of the tree, wherein the FSAs end in a tail automaton; and
    building an automaton reflecting a character transition by creating a new node with a transition from the new node pointing to an initial node of the tail automaton.

2. The method as claimed in claim 1, wherein the operators at least one of concatenation, alternation, and Kleene closure.

3. The method as claimed in claim 2, wherein a concatenation operation is performed by recursive construction in reverse order wherein each automaton built becomes the tail for the preceding argument.

4. The method as claimed in claim 2, wherein an alternation operation is performed by recursively building and merging automata corresponding to arguments of the alternation operation with a same tail.

5. The method as claimed in claim 2, wherein a Kleene closure operation is performed by:
building the automaton terminating in a unique marker;
merging the automaton with the tail automaton to form a combined automaton; and
traversing the combined automaton to expand the marker into transitions and states.

6. The method as in claim 4, including merging during the FSAs build by merging of minimal automata which only process combinations of different non-empty nodes as part of the alternation operation.

7. The method as in claim 5, including merging during the FSAs built by merging of minimal automata which only process combinations of different non-empty nodes as part of the Kleene closure operation.

8. The method as claimed in claim 1, including integration of the new node, comprising:
verifying if the new node belongs to a strongly connected component;
replacing the new node that does not belong to the strongly connected component by an existing equivalent class of node if the existing equivalent class exists; and
collecting together each new node that does belong to the strongly connected component, identifying the strongly connected component, and replacing each new node with by an existing combination of equivalent nodes for the component if the existing combination exists.

9. The method as claimed in claim 8, including:
maintaining a map of equivalent classes of nodes to which the new node is compared; and
adding a non-matching new node to the map.

10. The method as claimed in claim 8, including:
maintaining a map of equivalent classes of the strongly connected component; and
adding a non-matching collection of the new node for the strongly connected component.

11. A method of direct construction of a minimal finite state machine corresponding to a regular expression, comprising:
providing a regular expression represented as a regular expression tree with nodes of operators and leaves of elementary character transitions;
traversing the regular expression tree recursively to build minimal finite state automata (FSAs) corresponding to the branches of the tree, wherein one or more newly constructed nodes with a transition from the one or more newly constructed nodes pointing to an initial node of a tail automaton of the FSAs are processed by an integration procedure including:
verifying if the one or more newly constructed nodes belong to a strongly connected component;
replacing the one or more newly constructed nodes that does not belong to the strongly connected component by an existing equivalent class of node if the existing equivalent class exists;
collecting together each newly constructed node that does belong to the strongly connected component identifying the strongly connected component, and replacing each newly constructed node with an existing combination of equivalent nodes for the component if the existing combination exists.

12. A method of direct construction of a minimal finite state machine corresponding to a regular expression, comprising:
providing a regular expression represented as a regular expression tree with nodes of operators and leaves of elementary character transitions;
traversing the regular expression tree recursively to build minimal finite state automata (FSAs) corresponding to the branches of the tree, including:
using a unique marker to terminate an argument of a Kleene closure; and
expanding the unique marker into transitions and states; and
building an automaton reflecting a character transition by creating a new node with a transition from the new node pointing to an initial node of a tail automaton of the FSAs.

13. A computer program product residing on a computer readable medium having a plurality of instructions stored thereon which, when executed by a processor, cause the processor to perform operations comprising:
providing a regular expression represented as a regular expression tree with nodes of operators and leaves of elementary character transitions;
traversing the regular expression tree recursively to build minimal finite state automata (FSAs) corresponding to the branches of the tree, wherein the FSAs end in a tail automaton; and
building an automaton reflecting a character transition by creating a new node with a transition from the new node pointing to an initial node of the tail automaton.

14. A system of direct construction of a minimal deterministic finite state machine corresponding to a regular expression, comprising:
a processor;
means for providing a regular expression represented as a regular expression tree with nodes of operators and leaves of elementary character transitions;
means for traversing the regular expression tree recursively to build minimal finite state automata (FSAs) corresponding to the branches of the tree, wherein the FSAs end in a tail automaton; and
means for building an automaton reflecting a character transition by creating a new node with a transition from the new node pointing to an initial node of the tail automaton.

15. The system as claimed in claim 14, including:
means for performing a concatenation operation by recursive construction in reverse order wherein each automaton built becomes the tail for the preceding argument.

16. The system as claimed in claim 14, including:
means for performing an alternation operation including:
means for recursively building automata corresponding to the arguments of the operation with the same tail; and
means for merging the automata.

17. The system as claimed in claim 14, including:
means for performing a Kleene closure operation including:
means for building the automaton terminating in a unique marker;
means for merging the automaton with the tail automaton to form a combined automaton; and
means for traversing the combined automaton to expand the marker into transitions and states.

18. The system as in claim 16, wherein the means for merging merges minimal automata which only process combinations of different non-empty nodes as part of the alternation operation.

19. The system as in claim 17, wherein the means for merging merges minimal automata which only process combinations of different non-empty nodes as part of the Kleene closure operation.

20. The system as claimed in claim 14, including means of integration of the new node, comprising:
means for verifying if the new node belongs to a strongly connected component;
means for replacing the new node that does not belong to the strongly connected component by an existing equivalent class of node if the existing equivalent class exists; and
means for collecting together each new node that does belong to the strongly connected component, identifying the strongly connected component, and replacing each new node with an existing combination of equivalent nodes for the component if the existing combination exists.

21. The system as claimed in claim 20, including:
a map of equivalent classes of nodes to which the new node is compared; and
means for adding a non-matching new node to the map.

22. The system as claimed in claim 20, including:
a map of equivalent classes of the strongly connected components; and
means for adding a non-matching collection of the new nodes for the strongly connected component.

* * * * *